(12) United States Patent
Mora

(10) Patent No.: US 8,797,324 B2
(45) Date of Patent: Aug. 5, 2014

(54) DIRECT RAY TRACING OF 3D SCENES

(75) Inventor: Benjamin Mora, Swansea (GB)

(73) Assignee: UWS Ventures, Ltd., Swansea (GB)

( * ) Notice: Subject to any disclaimer, the term of this patent is extended or adjusted under 35 U.S.C. 154(b) by 64 days.

(21) Appl. No.: 13/354,578

(22) Filed: Jan. 20, 2012

(65) Prior Publication Data

US 2012/0169728 A1    Jul. 5, 2012

Related U.S. Application Data

(63) Continuation of application No. PCT/EP2009/059618, filed on Jul. 24, 2009.

(51) Int. Cl.
*G06T 15/50* (2011.01)
*G06T 17/00* (2006.01)
*G09G 5/00* (2006.01)

(52) U.S. Cl.
USPC ............................. 345/426; 345/420; 345/632

(58) Field of Classification Search
USPC .......................................................... 345/426
See application file for complete search history.

(56) References Cited

U.S. PATENT DOCUMENTS

| | | | |
|---|---|---|---|
| 8,085,267 B2 * | 12/2011 | Brown et al. | 345/426 |
| 8,253,730 B1 * | 8/2012 | Carr | 345/419 |
| 2006/0176302 A1 * | 8/2006 | Hayes et al. | 345/426 |
| 2007/0222780 A1 | 9/2007 | Keller | |
| 2008/0043018 A1 | 2/2008 | Keller et al. | |
| 2009/0096788 A1 | 4/2009 | Salisbury et al. | |
| 2009/0128562 A1 | 5/2009 | McCombe et al. | |
| 2009/0167763 A1 * | 7/2009 | Waechter et al. | 345/426 |
| 2009/0225081 A1 * | 9/2009 | Keller et al. | 345/426 |

OTHER PUBLICATIONS

Akenine-Moller, T. 2001. Fast 3D Triangle-Box Overlap Testing. Journal of Graphics Tools, vol. 6, No. 1, 29-33.
Bentley, J. L. Multidimensional binary search trees used for associative searching. 1975. In Communications of the ACM, vol. 18, No. 9, 509-517.
Cleary, J. G. and Wyvill, G. 1988. Analysis of an algorithm for fast ray tracing using uniform space subdivision. The Visual Computer, vol. 4, No. 2, 65-83.
Eberly, D. 2000. Intersection of a line and a cone, http://www.geometrictools.com|documentation/intersectionlinecone.pdf.
Fuchs, H., Kedem, Z. M., and Naylor B. F.1980. On visible surface generation by a priori tree structures. In Proceedings of SIGGRAPH 1980, vol. 23,124-133.

(Continued)

*Primary Examiner* — Kee M Tung
*Assistant Examiner* — Nicole Gillespie
(74) *Attorney, Agent, or Firm* — 24IP Law Group; Timothy R. DeWitt

(57) ABSTRACT

Determining intersections between rays and triangles is at the heart of most Computer Generated 3D images. The present disclosure describes a new method for determining the intersections between a set of rays and a set of triangles. The method is unique as it processes arbitrary rays and arbitrary primitives, and provides the lower complexity typical to ray-tracing algorithms without making use of a spatial subdivision data structure which would require additional memory storage. Such low memory usage is particularly beneficial to all computer systems creating 3D images where the available on-board memory is limited and critical, and must be minimized. Also, a pivot-based streaming novelty allows minimizing conditional branching inherent to normal ray-tracing techniques by handling large streams of rays. In most cases, our method displays much faster times for solving similar intersection problems than preceding state of the art methods on similar systems.

20 Claims, 10 Drawing Sheets

(56) References Cited

OTHER PUBLICATIONS

Fujimoto, A., Tanaka, T. and Iwata, K. 1986. Arts: Accelerated ray-tracing system. IEEE Computer Graphics and Applications, vol. 6, No. 4, 16-26.
Glassner A., S. 1984. Space subdivision for fast ray tracing. IEEE Computer Graphics and Applications, vol. 4, No. 10, 15-22.
Gribble, C. P. and Ramani, K. 2008. Coherent ray tracing via stream filtering. In Proceedings of the 2006 IEEE Symposium on Interactive Ray Tracing, 59-66.
Havran., V., Herzog, R., and Seidel H.-P. 2006. On the Fast Construction of Spatial Hierarchies for Ray Tracing. In proceedings of the 2006 IEEE Symposium on Raytracing, Salt-Lake City.
Hunt, W., Mark, W.R. and Stoll, G. 2006. Fast kd-tree Construction with an Adaptive Error-Bounded Heuristic. In proceedings of the 2006 IEEE Symposium on Raytracing, 81-88.
Ize, T., Shirley, P. and Parker, S. G. 2007. Grid Creation Strategies for Efficient Ray Tracing. In Proceedings of the 2006 IEEE Symposium on Interactive Ray Tracing, 27-32.
Kay, T. and Kajiya, J. 1986. Ray Tracing Complex Scenes. In Proceedings of SIGGRAPH'86, vol. 20, No. 4, 269-278.
Lagae, A. and Dutre, P. 2008. Compact, Fast and Robust Grids for Ray Tracing. In Proceedings of the Eurographics symposium on Rendering, 1235-1244.
Lauterbach, C., Yoon, S. and Manocha, D. 2006. RTDEFORM: Interactive Ray Tracing of Dynamic Scenes using BVHs. In Proceedings of the 2006 IEEE Symposium on Interactive Ray Tracing, 39-45.
Moller, T. and Trumbore, B. 1997. Fast, Minimum Storage Ray-Triangle Intersection. Journal of graphics tools, vol. 2, No. 1, 21-28.
Nakamaru, K. and Ohno, Y. 1997. Breadth-First Ray Tracing Utilizing Uniform Spatial Subdivision. IEEE Transaction on Visualization and Computer Graphics, vol. 3, No. 4, 316328.
Overbeck, R., Ramamoorthi, R. and Mark, W. R. 2007. A Real-Time Beam Tracer with Application to Exact Soft Shadows. In Proceedings of Eurographics Symposium on Rendering 2007.
Reshetov, A., Soupikov, A. and Hurley, J. 2005. Multi-level ray tracing algorithm. In Proceedings of ACM SIGGRAPH 2005, Los Angeles, vol. 24, No. 3, 1176-1185.
Rubin S., Whitted, J. 1980. A 3-dimensional representation for fast rendering of complex scenes. In Proceedings of SIGGRAPH'80, vol. 14, No. 3, 110-116.
Schmittler, J., Woop, S., Wagner, D., Paul, W. J., and Slusallek, P. 2004. Realtime Ray Tracing of Dynamic Scenes on an FPGA Chip. In proceedings of Graphics Hardware 2004, 95-106.
Shevtsov, M., Soupikov, A. and Kapustin, A. 2007. Highly Parallel Fast KD-tree Construction for Interactive Ray Tracing of Dynamic Scenes. In Proceedings of Eurographics 2007, 395-404.
Wachter, C. and Keller, A. 2006. Instant Ray Tracing: The Bounding Interval Hierarchy. In Proceedings of Eurographics Symposium on Rendering 2007, 139-149.
Wachter, C. and Keller, A. 2007. Terminating Spatial Hierarchies by a Priori Bounding Memory. In Proceedings of the 2007 IEEE Symposium on Interactive Ray Tracing, 41-46.
Wald, I., Slusallek, P., Benthin, C. and Wagner, M. 2001. Interactive Rendering with Coherent Ray Tracing. In Proceedings of EUROGRAPHICS'2001, Manchester, 153-164.
Wald, I., Ize, T., Kensler, A., Knoll, A., and Parker, S.G. 2006. Ray Tracing Animated Scenes using Coherent Grid Traversal. In Proceedings of ACM SIGGRAPH 2006, Boston, vol. 25, No. 3, 485-493.
Wald, I., Boulos, S., and Shirley, P. 2006B. Ray Tracing Deformable Scenes using Dynamic Bounding Volume Hierarchies Ingo. ACM Transaction on Graphics, vol. 26, No. 1, Article 6.
Whitted, T. 1980. An improved illumination model for shaded display. In Communication of the ACM, vol. 23, No. 6, 343-349.
Zhou, K., Hou, Q., Wang, R., Guo, B. 2008. Real-Time KD-Tree Construction on Graphics Hardware. In Proceedings of in proceedings of ACM SIGGRAPH ASIA 2008.

\* cited by examiner

|  |  | Wächter & Keller P4HT 2.8GHz | Shevtsov et al Core 2 3 GHz | DACRT Core 2 3 GHz |
| --- | --- | --- | --- | --- |
| Erw6, 806 tri. | 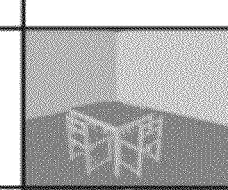 | 11 / 12 fps 0.23 / 0.25 × On/off optimization | 43 fps 0.9 × | 47 fps 1× |
| Bunny, 69K tri. |  | 6 / 5.6 fps 0.3 / 0.28 × On/off optimization | 9.6 fps 0.48 × | 19.6 fps 1× |
| Dragon, 863K tri. |  | 0.9 / 0.64 fps 0.16 / 0.11 × On/off optimization | 1.3 fps 0.24 × | 5.4 fps 1× |
| Conference, 1.02M tri. |  | 1.5 / 0.65 fps 0.12 / 0.05 × On/off optimization | 1.6 fps 0.13 × | 12 fps 1× |
| Buddha, 1.08M tri. |  | 1.4 / 0.54 fps 0.14 / 0.05 × On/off optimization | 1.4 fps 0.14 × | 9.6 fps 1× |
Fig. 6

| | OpenGL NV 8800 GTX Normal/ Display Lists | Shevtsov et al [2007] Core 2 3 GHz | Lagae & Dutré [2007] XS365 3GHz w/ faster grid | DACRT Core 2 3 GHz | Wald et al. [2006] BVH Opter. 2.6GHz 16x16 packets | MLRT from [Overbeck et al. 2007] P4HT 3GHz | Reference SAH Ray Tracer 8×8 Packet Core 2 3GHz |
|---|---|---|---|---|---|---|---|
| Cores or Threads used | 768 | 4 | 1 | 1 | 1 | 1 | 1 |
| Renderer Type | Dynamic | Dynamic | Dynamic | Dynamic | Mixed | Static | Static |
| Erw6 804 triangles | 1K/1K fps 65/65 × | | | 15.3 fps 1× | 71/42 fps 4.6/2.8 × *build/render* | 74/13 fps 4.8/0.84 × *quad on/off* | 5.1 fps 0.33 × |
| Bunny 69 K triangles | 211/1K fps 22/105 × | | 1.44 fps 0.15 × | 9.5 fps 1× | | | 3.38 fps 0.35 × |
| Fairy 174 K triangles | 45/66 fps 6.6/9.7 × | 5.84 fps 0.85 × *tex+2 lights* | | 6.8 fps 1× | | | 3.7 fps 0.54 × |
| Cabin 217 K triangles | 18/166 fps 1.5/14.4 × | | 0.38 fps 0.033 × | 11.5 fps 1× | 0.35/6.4 fps 0.05/0.94 × *1st build/next im.* | | 4.2 fps 0.37 × |
| Conference 282K triangles | 26/333 fps 2.5/32 × | | | 10.1 fps 1× | 0.2/10.5 fps 0.02/1.03 × *build/render* | 10.8/ 5.6 fps 1.25/ 0.65 × *quad on/off* | 3.6 fps 0.35 × |

Fig. 7

| Model | | | | | | | | |
|---|---|---|---|---|---|---|---|---|
| Armadillo 345K triangles | | 1/3/33 fps 2.4/63 × | | 1.05 fps 0.2 × | 5.2 fps 1 × | | 7/4.3 fps 1.32/0.82 × *quad on/off* | 4.7 fps 0.9 × |
| Conference 1.02 M triangles | | 7/15.5 fps 0.8/1.8 × | | 0.41 fps 0.04 × | 8.6 fps 1 × | | | 2.7 fps 0.31 × |
| Buddha 1.08 M triangles | | 6.9/15.1 fps 1.6/3.6 × | 2.1 fps 0.5 × *build only* | 1.38 fps 0.33 × | 4.2 fps 1 × | | | 4.2 fps 1 × |
| Soda Hall 2.2 M triangles | | 3.3/9 fps 0.37/1.02 × | 2.1 fps 0.24 × *build only* | | | 0.05/NA fps 0.01/NA × *build/render* | | |
| Dragon 7.2 M triangles | | 1.03/2.77 fps 0.66/1.77 × | 0.58 fps 0.37 × *build only* | | 8.7 fps 1 × | 0.018/12 fps 0.002/1.4 × *build/render* | 16.2/7.3 fps 1.84/0.84 × *quad on/off* | 6.9 fps 0.69 × |
| Thai Statue 10 M triangles | | 0.67/1.81 fps 0.55/1.56 × | 0.4 fps 0.31 × *build only* | 0.36 fps 0.28 × | 1.28 fps 1 × | | | 2.24 fps 1.43 × |
| Lucy 28 M triangles | | 0.26/NA fps 0.57/NA × | | 0.19 fps 0.43 × | 0.45 fps 1 × | | | 1.46 fps 1.27 × |
| | | | | | | | | 0.73 fps 1.61 × |

Fig. 7 contiued

DIRECT RAY TRACING OF 3D SCENES

CROSS-REFERENCE TO RELATED APPLICATIONS

The present application is a continuation of PCT Application No. PCT/EP2009/059618 entitled "Direct Ray Tracing of 3D Scenes" and filed on Jul. 24, 2009.

The aforementioned PCT patent application is hereby incorporated by reference in its entirety.

BACKGROUND OF THE INVENTION

1. Field of the Invention

The present invention relates to the field of computer graphics images of 3D (three-dimensional) scenes or spaces. The present invention also relates to a method and a computer system for rendering computer graphics images using ray-tracing.

2. Background of the Invention

Ray-Tracing (RT) is a fundamental, much investigated and much used computer graphics algorithm for solving primitive/ray intersections, for example in displaying three dimensional objects and scenes on two-dimensional displays or screens. Primitives are used to describe the scene, while rays are used to model light paths. Unlike rasterization, RT can accommodate any ray parameterization, which makes it useful for numerous rendering problems. The basic algorithm for solving a RT problem, often referred to as naïve ray-tracing, is well-known and comprises intersecting each ray used for the rendering of a graphical image with all primitives defining a particular 3D (three-dimensional) scene. However, the trivial complexity of this algorithm—O(primitives×rays)—is not suitable for most applications that nowadays handle large quantities of rays and primitives. As such, naïve RT as proposed by Whitted (1980) has been quickly discarded and spatial subdivision data structures have been subsequently used and widely investigated to reduce the per-ray complexity of the algorithm. See, Whitted, T., "An improved illumination model for shaded display," *Communication of the ACM*, Vol. 23, No. 6, 343-349 (1980). Indeed, naïve ray-tracing can be millions of time slower than current approaches when very large scenes with millions of primitives are handled.

All algorithms proposed subsequent to Whitted carry out the following steps: 1: Compute a spatial subdivision data structure; 2: Trace rays (and possibly continue constructing spatial subdivision); to solve intersections between rays and primitives like triangle. Such algorithms require extra memory on the system to solve the problem.

Early proposed spatial subdivisions included kd-trees (Bentley, J. L., "Multidimensional binary search trees used for associative searching," *Communications of the ACM*, Vol. 18, No. 9, 509-517 (1975)), Bounding Volume Hierarchies (BVH) (S. Rubin and J. Whitted, "A 3-dimensional representation for fast rendering of complex scenes," *Proceedings of SIGGRAPH '80*, Vol. 14, No. 3, 110-116; Kay, T. and Kajiya, J. "*Ray Tracing Complex Scenes*," *Proceedings of SIGGRAPH '86*, Vol. 20, No. 4, 269-278 (1986)), BSP-trees (Fuchs, H., Kedem, Z. M., and Naylor B. F., "*On visible surface generation by a priori tree structures*," *Proceedings of SIGGRAPH 1980*, Vol. 23, 124-133 (1980)), Octrees (Glassner A., "Space subdivision for fast ray tracing," *IEEE Computer Graphics and Applications*, Vol. 4, No. 10, 15-22 (1984)) and grids (Fujimoto, A., Tanaka, T. and Iwata, K. "Arts: Accelerated ray-tracing system," *IEEE Computer Graphics and Applications*, Vol. 6, No. 4, 16-26 (1986)). All of these implementations use spatial subdivision data structures that require additional memory to solve the problem.

For rendering static scenes, RT has usually been considered a very efficient rendering technique if the construction times of the acceleration data structure are ignored. However, recent efforts have focused more on the rendering of scenes containing dynamic objects/primitives, and therefore the construction times must now be considered as the spatial subdivision data structure needs to be modified/recomputed each time the scene is modified. This raises a few issues as extra construction time is likely to provide a better tracing rate, while faster construction times may see tracing times degrading. As such, Wald et al. (2006) recognized that a good balance could be difficult to find, and proposed the use of grids as an original alternative to the long construction times of hierarchical space subdivision data structures, such as kd-trees. See, Wald, I., Ize, T., Kensler, A., Knoll, A., and Parker, S. G., "Ray Tracing Animated Scenes using Coherent Grid Traversa," *Proceedings of ACM SIGGRAPH 2006*, Boston, Vol. 25, No. 3, 485-493 (2006) and Wald, I., Boulos, S., and Shirley, P., "Ray Tracing Deformable Scenes using Dynamic Bounding Volume Hierarchies Ingo," *ACM Transaction On Graphics*, Vol. 26, No 1, Article 6 (2006).

As grids are renowned for a lower tracing complexity of $O(n^{1/3})$ (Cleary, J. G. and Wyvill, G., "Analysis of an algorithm for fast ray tracing using uniform space subdivision," *The Visual Computer*, Vol. 4, No. 2, 65-83 (1988); Ize, T., Shirley, P. and Parker, S. G., "Grid Creation Strategies for Efficient Ray Tracing," *Proceedings of the 2006 IEEE Symposium on Interactive Ray Tracing*, 27-32 (2007)), a fast packet traversal was also proposed. Further work on grids has then been produced by Lagae, A. and Dutré, P., "Compact, Fast and Robust Grids for Ray Tracing," *Proceedings of the Eurographics symposium on Rendering*, 1235-1244 (2008), focusing more on both the grid construction times and low memory usage. Results produced by Lagae and Dutré clearly show that grid structure can be computed at an extreme speed and that rendering times are more ray-bounded. However, some discrepancy in rendering times given by Lagae and Dutré is visible, and grids seem to perform noticeably worse for scenes with anisotropic triangles, as predicted by Ize et al.

The use of tree structures is also described in the content of US 2008/0043018 which is incorporated by reference herewith.

Kd-trees data structures are slower to construct than grids, although more reliable for tracing. However, Hunt et al., "Fast kd-tree Construction with an Adaptive Error-Bounded Heuristic," *Proceedings of the 2006 IEEE Symposium on Raytracing*, 81-88 (2006) and Shevtsov, M., Soupikov, A. and Kapustin, A., "Highly Parallel Fast KD-tree Construction for Interactive Ray Tracing of Dynamic Scenes," *Proceedings of Eurographics 2007*, 395-404 (2007) have introduced a method that achieves an interactive construction of the data structure that even includes a very fast Surface Area Heuristic (SAH) estimation. The tracing part of Shevtsov et al.'s algorithm was managed by a very fast MLRT algorithm, with the observation that a reduction in the tree quality could be suitable if fewer rays are to be traced. Zhou et al. have overcome the task of porting the kd-tree construction on a GPU, showing some clear acceleration. See, Zhou, K., Hou, Q., Wang, R. and Guo., B. "Real-Time KD-Tree Construction on Graphics Hardware," *Proceedings of In proceedings of ACM SIGGRAPH ASIA 2008* (2008). In comparison with the grids, the use of the kd-trees seems much more primitive-bounded, as a lot more rendering time is generally spent constructing the spatial subdivision data structure and much less in tracing.

For animated scenes such as movies, a reconstruction of a full data structure at each frame may be losing some information, and a simple update of the data structure is sometimes more logical. Wald et al. (2006) and Lauterbach, C., Yoon, S. and Manocha, D., "RTDEFORM: Interactive Ray Tracing of Dynamic Scenes using BVHs," *Proceedings of the 2006 IEEE Symposium on Interactive Ray Tracing*, 39-45 (2006) thus independently demonstrated that Bounding Volume Hierarchies (BVH) data structures are well suited to this task, although the time needed to compute the original BVH is not interactive for moderately large scenes.

US 2009/0128562, which is incorporated by reference herewith, describes a ray tracing method, wherein a geometry acceleration data structure is determined and stored for a given scene prior to performing the actual ray-tracing. Ray/primitive intersections are tested using a parallel testing resource.

A drawback to all previously mentioned approaches is that the memory footprint, i.e. the memory resources required, may vary between the frames, which is a disadvantage with regard to software engineering, as dynamic allocation should then be involved to optimize memory management on the system such that memory is only allocated when needed. Instead, many approaches do not include the cost of dynamic allocation in their discussion and just make use of pre-allocated memory. Nonetheless, Lagae and Dutré presented a framework for dynamic re-allocation with limited impact. The importance of memory management was acknowledged by Wachter and Keller, who proposed Bounding Interval Hierarchies (BIHs) where the maximum memory usage is linearly bounded by the number of triangles. See, Wachter, C. and Keller, A., "Instant Ray Tracing: The Bounding Interval Hierarchy," *Proceedings of Eurographics Symposium on Rendering* 2007, 139-149 (2006) and Wachter, C. and Keller, A., "Terminating Spatial Hierarchies by A Priori Bounding Memory," *Proceedings of the 2007 IEEE Symposium on Interactive Ray Tracing*, 41-46 (2007).

Although the memory usage is not exactly deterministic, this BIH property is possible because there is no need to replicate triangle indices. An original, on demand construction was also demonstrated, where only a partial tree is constructed before tracing. During the backtracking tracing process, the construction is eventually completed for temporary leaf nodes that are reached, possibly avoiding processing occluded regions of the scene. As a result, the memory needed for the BIH is typically only a fraction of that needed for other methods.

As mentioned above, all methods suggested so far make use of a compulsory additional data structure, such as the spatial subdivision data structure, which in RT is often seen as a burden by developers, and makes RT more complex. Therefore, a new method based on the naïve algorithm that can directly solve intersections between a set of rays and a set of primitives at no or reduced additional memory cost is of much interest, especially if the method is proven to be fast.

SUMMARY OF THE INVENTION

The present disclosure is based on the observation, that a complexity of O(nb_primitives) to find a ray's closest intersection with the naïve algorithm does not necessarily imply a complexity of O(nb_primitives×nb_rays) for a problem including nb_rays rays, where a new divide-and-conquer approach can actually reduce the solution space. In one aspect, the present disclosure is an algorithm having for the first time a low complexity without using a spatial subdivision data structure.

The present disclosure relates to a method, a computer program product and computer system for determining possible spatial intersections between an initial set of rays and an initial set of primitives for the purpose of creating a computer graphics image of a three-dimensional scene. The method may be computer implemented and may be implemented in a computer program. The method comprises the steps of: (a) Determining a multidimensional space region related to the three dimensional scene that comprises all the primitives of the initial set of primitives; (b) Testing if a halting criterion is met; if the halting criterion is met, determining intersections between the initial set of rays and the initial set of primitives by testing all possible ray/primitive intersection and continuing with step (f); if the halting criterion is not met, continuing with step (c) of dividing the initial region into two or more subregions and step (d) of determining for each one of the two or more subregions, a subset of rays from the initial set of rays which are intersecting the one of the two or more subregions; and determining a subset of primitives from the initial set of primitives which are intersecting the one of the two or more subregions; Step (b) is recursively repeated for each one of the two or more subregions, wherein the initial region is replaced by the respective one of the two or more subregions, the initial set of rays is replaced by the subset of rays, and the initial set of primitives is replaced by the subset of primitives. In this way the initial problem is subdivided into smaller problems that are less complex to solve. A problem meeting the halting criterion may eventually be solved directly using naïve ray tracing i.e. if the set of rays does meet the halting criterion, the method determines intersections between the set of rays and the set of primitives with the naïve ray-tracing algorithm presented by Whitted (1980), followed by an update of intersection results.

The present invention may have an algorithmic complexity that matches the complexity of traditional ray-tracing algorithms that aim to solve identical problems by first computing and storing a spatial subdivision data structure and then tracing rays using the data structure.

The size of the multidimensional space to be divided may be fixed to n dimensions, wherein n≥2. For example, the multidimensional space may be initially fixed as a 2-dimensional space, a 3-dimensional space, a 4-dimensional space.

Each one of the set of rays may correspond to a ray of light needed to solve a given rendering problem. This may include primary rays determined from the viewpoint and each pixel of the image, shadow rays emitted from a light source, or more general rays simulating the paths of photons. Each ray of the initial set of rays may correspond to either a primary ray cast from a camera, or a shadow ray cast toward a light source, or any random direction in space. The rays may be replaced or represented by lines and the invention may be used to determine line/primitive intersections.

Each primitive of the set of primitives may be a geometric primitive as known in the art. For example, a primitive may be a triangle, a tetrahedron, a cube, a voxel, subdivision surfaces, or nonuniform rational B-splines (NURBS).

The halting criterion may relate to at least one of the initial set of primitives, the initial set of rays, the initial region or the recursion depth. For example, the halting criterion is met if either the number of rays in the initial set of rays is less than a first value, or the number of primitives in the initial set of primitives is less than a second value, or a maximum recursion depth, or a combination thereof is reached. The first value and the second value may be dynamically modified when the method is applied to dynamic scenes. This allows optimization of the method.

Step (d) may further comprise streaming all rays of the initial set of rays or all primitives of the initial set of primitives. All streaming operations may be done in-place, i.e. on the same computer system, using pivots.

The present disclosure also presents an efficient way of storing the scene in memory, to perform in-place computations, pivot-based algorithms to stream rays and primitives, and for grouping rays into (conic) packets to accelerate the algorithm.

This new approach for the naïve ray-tracing has led to a method, a computer program product and a computer system that represents a major improvement in ray-tracing (RT) in the following areas:

RT Paradigm—The present disclosure describes a new and simple RT technique, and its divide-and-conquer principles can potentially be applied to all spatial subdivision schemes studied to date, without the need to store a spatial subdivision data structure. Also, the RT is achieved in a recursive breadth-first quicksort, like streaming fashion using pivots, contrasting with normal tracing techniques, which mainly resort to recursive depth-first traversals of spatial subdivisions.

Rendering Speed—The breadth-first double streaming approach combined with new optimizations such as conic packets provides an inherently efficient algorithm that can be up to an order of magnitude faster for dynamic scenes and is almost on-par with static ray-tracers on equivalent hardware. The new breadth-first streaming approach also almost eliminates conditional branching happening with top-down traversals of spatial subdivision, and is particularly fast for processing rays that exhibit little coherency in space. The breadth-first streaming approach is particularly suitable for hardware-based ray-tracing and can also be implemented in normal ray-tracing algorithms using pre-computed spatial subdivision data structures.

Minimal and Deterministic Memory Usage—The memory requirement of the new ray/primitive intersection algorithm is reduced as it only requires the rays and the primitives to be stored, and can be determined in advance as a linear function of the number of the primitives and the number of the rays. This permits solving of larger problems and can be of interest when specific rendering hardware with limited onboard memory is involved.

Engineering Flexibility with no Pre-Processing—This is a direct consequence of the previous point. Flexibility of the ray-tracing is improved because no pre-processing step computing a spatial subdivision data structure is required and intersections are directly computed. The software engineering side is simplified, especially in dynamic scene contexts, as handling or storing an additional spatial subdivision data structure either in memory or on disk is no longer required.

The present disclosure describes the determination of ray/primitive intersections. However, the same method may be equally applied to determine primitive/primitive intersections with no or only small obvious modifications that a person skilled in the art may do.

BRIEF DESCRIPTION OF THE DRAWINGS

FIG. 6 shows rendering times of the present disclosure obtained and compared with the Wachter and Keller tests.

FIG. 7 shows ray-casting timing results for 1024×1024 images with conic packet optimization enabled, also including recent state-of-the-art approaches.

DETAILED DESCRIPTION OF THE PREFERRED EMBODIMENTS

Figure 1:
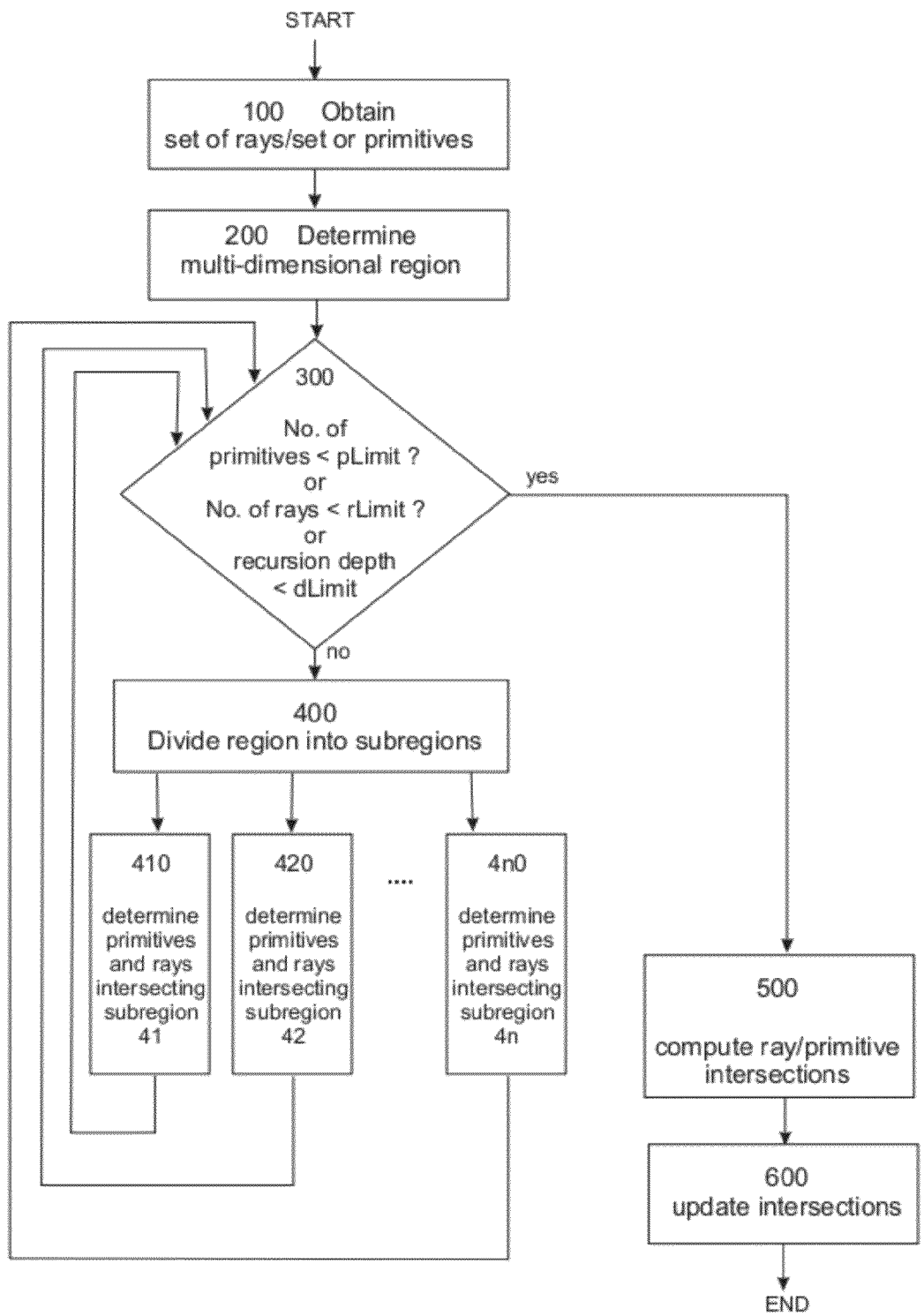
FIG. 1 is a flowchart of the main ray-primitive intersection algorithm of the present disclosure.

The naïve ray-tracing (naïve RT) algorithm comprises two nested loops computing every possible ray-triangle intersection in a scene at a complexity of O(primitives×rays). This naïve ray-tracing approach is processing far too many intersections. The present disclosure suggests simplifying the problem by only intersecting subsets of rays with subsets of triangles, which will be determined by a divide-and-conquer scheme using spatial subdivisions, as in the Algorithm 1:

---
Algorithm 1 Divide-And-Conquer Ray-Tracing
---
procedure DACRT( SpaceRegion E, SetOfRays R, SetOfPrimitives P)
begin
    if R.size < rLimit or P.size < pLimit or depth < dLimit
    then NaiveRT ( R, T );
    else begin
        {$E_i$} = SubdivideSpaceRegion ( E )
        for each $E_i$ do
            SetOfRays R' = R ∩ $E_i$;
            SetOfPrimitives P' = P ∩ $E_i$;
            DACRT ( $E_i$, R', P' );
        end do
    end
end

---

This method is termed divide-and-conquer ray tracing (DACRT). The DACRT algorithm first compares—step 300—the number of primitives, which are triangles in the examples shown herein, and the number of rays involved in the problem with two arbitrary fixed constants pLimit and rLimit. The depth of recursion may additionally be compared to a fixed constant dLimit. If one of the three comparisons respectively with the three fixed constants pLimit, rLimit, and dLimit is true, then the halting criterion is met, and the algorithm just uses the naïve RT algorithm—step 500—. Otherwise, the region is subdivided—step 400—into subregions 41, 42, . . . 4n, (n>0) and a recursive call is made for each one of the subregions only including the primitives and the rays intersecting the given subspace. Note that a region subdivision is not restricted to an Euclidian 3D space, but could be performed for instance in either an image space (2D), a light field (4D) space, or even inside a higher-dimensional space. Also, all computations and intersections can actually be performed in-place in a breadth-first (Nakamaru, K. and Ohno, Y. "Breadth-First Ray Tracing Utilizing Uniform Spatial Subdivision," *IEEE Transaction on Visualization and Computer*

*Graphics*, Vol. 3, No. 4, 316-328 (1997)) quicksort fashion using pivots, and only a small recursion stack is additionally needed, which can be stored on less than 16 kilobytes of memory.

Basic Implementation

In the following examples, the primitives are triangles and the associated space subdivision is a 3D axis-aligned spatial subdivision (AASS), as commonly used with kd-trees. The AASSs were chosen as an example because it is a common and well-proven technique which can be used for the DACRT method described herein, although other subdivision schemes known in the art may be used. The basic implementation may further include, in addition to the basic algorithm, in-place computations, front-to-back traversal associated with early-ray termination, and also novelties such as conic packet tracing, fast triangle streaming and simplified split determination that are described below.

Figure 2:
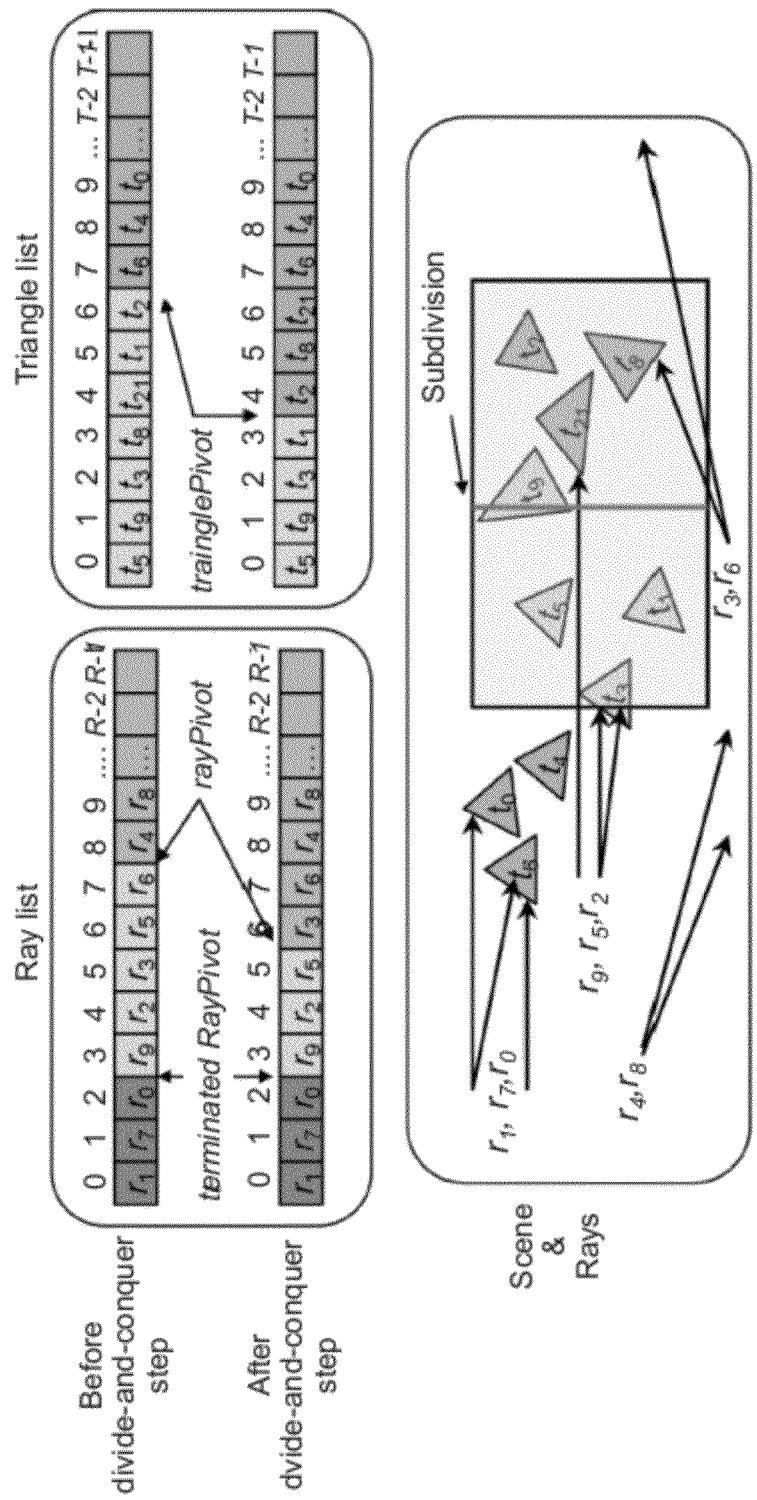
FIG. 2 illustrates in-place reordering of both ray and primitive arrays after one divide-and-conquer step, before and after branching on the left subregion.

An in-place algorithm is used to make the memory usage minimal and deterministic. If we accept the recursion stack— which is a matter of a few kilobytes—the DACRT method just requires triangles and rays to be linearly stored in two separated lists as shown in FIG. 2. Two integer pivots are needed at each one of the recursion steps to differentiate the triangles and the rays that are either inside or outside the current subdivision or subregion, and our method will re-order the elements of these two separated ray and primitive lists accordingly at each step. A third ray pivot is also needed for the early ray termination optimization that can be added to the basic algorithm. To reduce memory transfers by not moving triangle and ray data structures directly in main memory, two indexing arrays can also be used. The memory usage is then increased at a linear cost of four additional bytes for each one of the triangles or rays considered, but still remain deterministic.

At the heart of every new recursive call to the DACRT function is a streaming operation (or filtering process) that separately sorts the triangles and the rays in a breadth-first quicksort fashion. For the triangles, indices are parsed between 0 and a trianglePivot index. A new trianglePivot index is then generated such that the triangles indexed at the left hand side of the pivot intersect the new subdivision while the triangles indexed at the right hand side do not (FIG. 2). The same filtering process is applied to the rays, with the noticeable difference that only those rays with indices between the terminatedRayPivot and the old rayPivot are to be filtered to generate the new rayPivot. Each basic streaming operation in FIG. 2 involves either ray-box or primitive-box intersection algorithms.

The naïve ray-tracing is used whenever the problem has been reduced to a small enough size. The two constants rLimit and pLimit of algorithm 1 have been respectively fixed to 20 and 16 as an example. Lower or higher values may be used but were found to degrade performance with the test conditions. As such, 320 intersections at most must be computed when recursion stops. The Möller and Trumbore intersection test is used to solve intersections between rays and triangular primitives, with a rate of approximately 25 clock cycles per intersection for our streaming SIMD extensions (SSE) version. See, Möller, T. And Trumbore, B., "Fast, Minimum Storage Ray-Triangle Intersection," *Journal of graphics tools*, Vol. 2, No. 1, 21-28 (1997). Faster intersection implementations do exist and may be equally applied, but typically increase memory requirements.

The early ray termination avoids computing intersections beyond the first successful intersection. To do this, spatial subregions must be investigated in a front-to-back order by processing the subdivision that is on the same side as the viewpoint first, and the other side next. When the naïve RT function is called, intersections between all of the rays inside the terminatedRayPivot and rayPivot range (FIG. 2), and all of the triangles between the first index and the trianglePivot index are computed. If ray/primitive intersections are detected, the successful rays are terminated by moving a rayPivot index to the right and adding the terminated ray indices to the left hand side of the pivot (FIG. 2). By using the early ray termination procedure, occluded triangles inside the scene are quickly discarded and their impact on rendering times is significantly reduced.

Complexity of the basic method (without packets) applied to axis-aligned subdivisions is bounded by the complexity of a simple kd-tree construction followed by a non packet RT algorithm. This comes from the observation that the algorithm will traverse the same spatial subdivision tree as a pure kd-tree construction algorithm, and for each triangle that is parsed in the DACRT method presented herein there would be an equivalent operation in the kd-tree construction algorithm. Note that the DACRT algorithm is bounded as invisible regions of the kd-tree are actually not treated if none of the rays traverses these invisible regions. Furthermore, each ray streaming operation (i.e., intersection test) corresponds to a single ray-node traversal in the regular ray-tracing algorithm. As such, the complexity of the method is much lower than that of the naïve ray-tracing algorithm, and results clearly show that the rendering problems where the naïve ray-tracing algorithm would normally perform hundreds of billions of intersections can actually be solved in less than a second.

Conic Packets

In regular RT, pyramidal ray packets (Wald, I., Slusallek, P., Benthin, C. and Wagner, M., "Interactive Rendering with Coherent Ray Tracing," *Proceedings of EUROGRAPHICS'2001*, Manchester, 153-164 (2001)) are an acceleration technique that significantly reduces the number of nodes traversed if both the rays and the scene feature sufficient spatial coherency (e.g., grouping primary rays). However, running a pyramidal ray packet/node intersection can be expensive in terms of memory and time, as the pyramid comprises several faces. Running this pyramidal ray packet/node intersection test is therefore often simplified. See, Reshetov et al. 2005. Also, determining the pyramid for secondary rays is a slightly more complex task. See, Wald et al. (2006). A new technique termed conic packets is described below, where the pyramid is replaced by a cone, allowing exact cone-box intersection tests.

The cones are internally defined with a data structure that include the main cone direction, an angle $\alpha$, and a 64-bit variable that stores the termination status of each ray inside the packet. Initialization of the cones takes place immediately following ray generation, with no modification afterward of the data structure. The (maximum) packet size is fixed to 8×8 rays so that the 64-bit variable can hold all the termination statuses, and a cone test may replace at most 64 ray tests. $\alpha$ is determined such that there exists no ray in the packet whose angle with the main cone direction is greater than $\alpha$. The inclusion of cones inside the DACRT method is easily achieved by replacing rays with cones in algorithm 1 and adding a third indexing list for the cones. The only difference is that when the termination criteria are valid, a call is made to the normal DACRT function instead of calling the naïve RT function. This requires both flushing the rays inside the cones into a ray index list, prior to the call (after the terminatedRayPivot position); and updating the cone termination bits, and possibly removing the cones with all bits set to 1 after the call. The modified algorithm is given in Algorithm 2. Note that the same method is used for computing shadow rays to a point light source, which simply requires redefinition of the cones from the light source and intersection points of each packet.

The intersections of the cones with boxes or primitives is a simple step that must be performed efficiently during the streaming process. The technique first involves detecting whether the main cone direction intersects the box. If not, the algorithm must also investigate whether or not there is an intersection with any of the 12 edges of the box or not. If not, the cone does not intersect the box. At first glance, this intersection process seems inefficient, however it takes advantage of two factors. Firstly, the initial test of detecting whether the main cone direction intersects the box is statistically often positive, avoiding the second step. Secondly, the edge tests can be limited by induction to the square defined by the intersection of a splitting plane and the box, as the cones already intersect the parent box, which reduces the number of tests to 4. The mathematics determining an edge-cone intersection (EBERLY, D. 2000, "Intersection of a line and a cone," HTTP://WWW.GEOMETRICTOOLS.COM/DOCUMENTATION/INTERSECTIONLINECONE.PDF) are given in the annex section, and involve solving a second-degree polynomial.

---

Algorithm 2 Conic-packet version of DACRT

--- procedure DACRT_Packet (Space E, SetOfCones C, SetOfPrimitives P )
begin
    if C.size < cLimit or P.size < pLimit or depth < dLimit
    then begin
        SetOfRays R = FlushRaysInCones( C );
        DACRT ( E, R, P );
        end
    else begin
        {$E_i$} = SubdivideSpace ( E )
        for each $E_i$ do
            SetOfCones C' = C ∩ $E_i$;
            SetOfPrimitives P' = P ∩ $E_i$;
            DACRT_Packet ( $E_i$, C', P' );
        end do
    end
end

---

Triangle Streaming and Parsing

Quickly streaming triangles is useful, especially if the scene is large. The current implementation can stream approximately 300 million triangles per second and can perform as many simplified triangle-box intersections on a single 3 GHz core processor, which is enough to process multi-million triangle scenes interactively. For this task, we have chosen the triangle-box intersection method given by Akenine-Möller, with many simplifications made. See, Akenine-Möller, T. 2001, "Fast 3D Triangle-Box Overlap Testing," *Journal of Graphics Tools*, Vol. 6, No. 1, 29-3. This triangle-box intersection method uses the separating axis theorem where 13 specific plane orientations must be tested. Some of these triangle-box intersection tests can actually be removed without hampering the final solution, though adding extra intersection tests later on in the process. The triangle plane is one of these plane orientations, but has been removed from the test as early results showed that it was a slow, and rarely determinant test.

Three other directions to be tested are given by the orientations of the bounding box's faces. As, again by induction, some of these intersection tests have been carried out at higher levels of the hierarchy, these intersection tests can be replaced by a single test with the split plane. We also observed that for large streams, most of the triangles had their three vertices on the same side of the split plane, which justifies the next optimization.

The final nine tests are based on directions given by the cross-products of the three triangle edges and the three cube edges. Because these nine tests are also resource-consuming, they are only carried out when the number of triangles in the stream is small enough. This number has been arbitrarily fixed to 100 and helps to reduce the number of forthcoming ray-triangle intersection tests considerably.

Figures 3A, 3B:
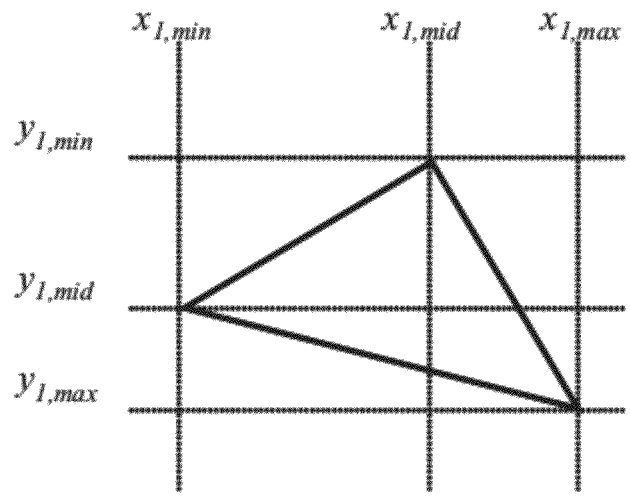
FIG. 3 shows a memory storage scheme of a scene used with the present disclosure by decomposition into four separate memory aligned lists for efficient memory access.
Figure 4:
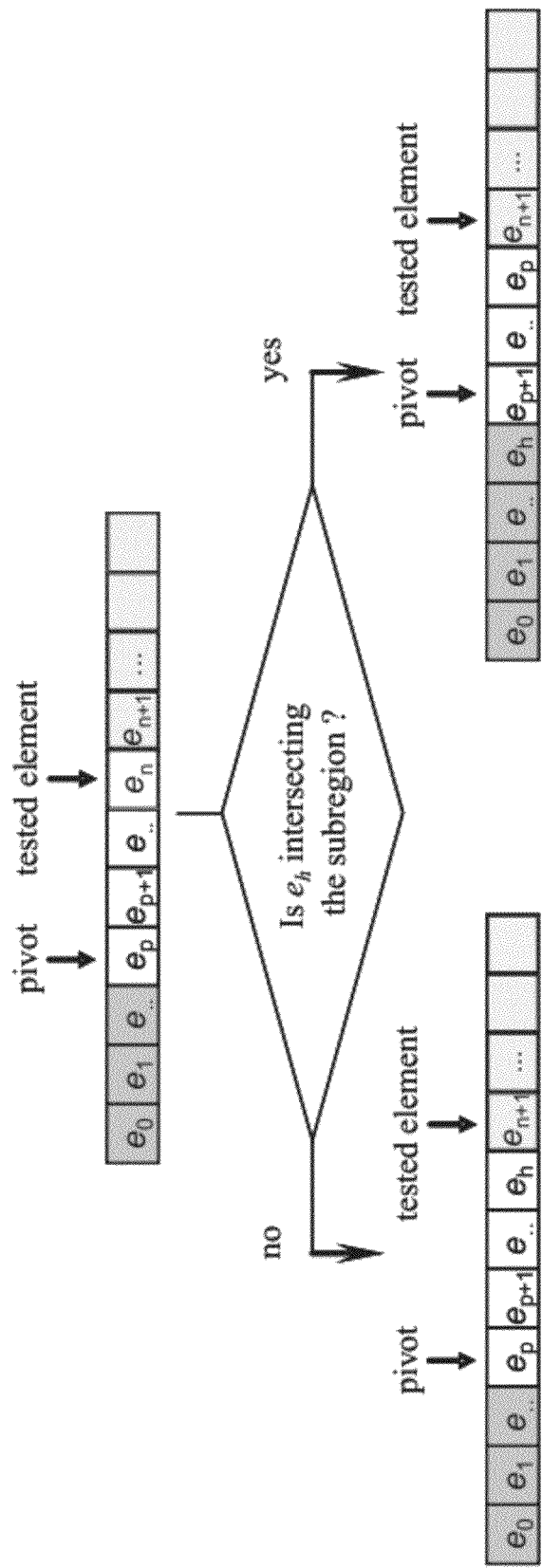
FIG. 4 illustrates an in-place modification of a list according to one intersection test between one element of the list and a subregion.

Therefore, only a single test with the splitting plane is needed in most streaming cases, which is extremely fast as four comparisons can be carried out in one SSE (Streaming SIMD Extensions) instruction. To speed up this single test, a particular triangle storage has been designed. A 36-byte triangle representation has been chosen, with values initially re-shuffled so that the triangle's min-max coordinates on each axis appear in separate lists as illustrated in FIG. 3. As such, only four 64-bit loads followed by one SSE shuffle operation are needed before testing four triangles at a time. Another four bytes are added in the fourth list for data alignment and also storing the bits required for reordering vertex coordinates. Reordering is done on the fly whenever required (e.g., 12-case triangle-box intersections and triangle/ray intersections) and its cost is negligible in comparison with other operations. Indeed, the slight time increase for reordering is largely compensated by the considerable decrease of the time needed for streaming triangles. Taking into consideration the 32-bit integer needed for indexing each triangle, the—deterministic— linear memory usage is 44 bytes per triangle. We have chosen this particular scheme as a good trade-off between memory consumption and rendering speed, though we could have either reduced or increased this requirement to the benefit of one of these. Other schemes may equally be used with the present disclosure and a person skilled in the art may modify the schemes according to the needs.

Axis-Aligned Subdivision

Figure 5:
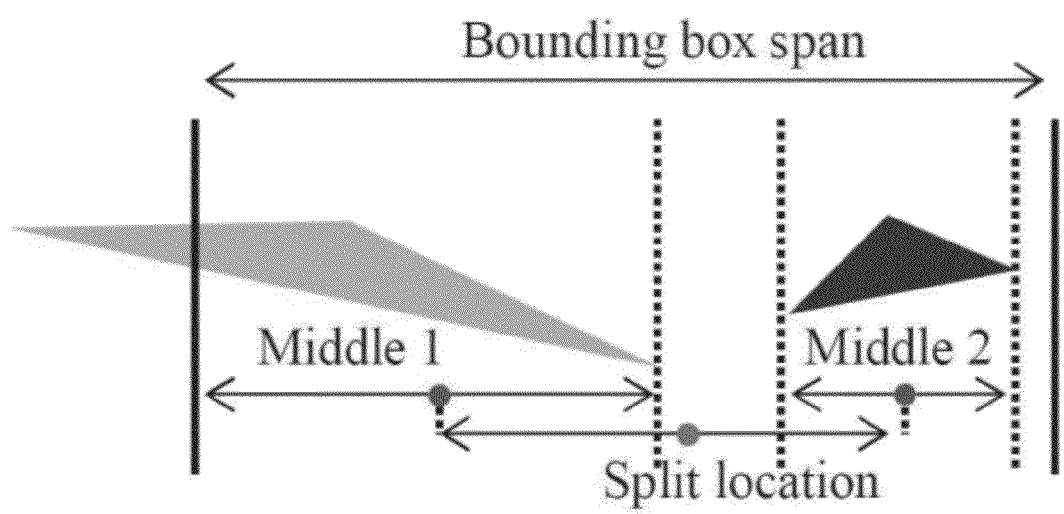
FIG. 5 shows a fast simple region subdivision determination used with the present disclosure.

The known Surface Area Heuristic (SAH) is the best subdivision scheme known to date for kd-trees. Unfortunately it is relatively slow at subdividing spatial regions, though it usually provides some good tracing speedup. Instead, we favoured brute-force streaming of the triangles, with a simplified determination of the splitting axis and position. The splitting axis is determined by the longest direction of the bounding box/space region. For the position itself, two different schemes are used according to whether less than, for example, 10000 triangles are to be scanned or not. For large streams, a 50th of the triangles are evenly selected in the stream and are analyzed to estimate the split so that it adds only a small amount of time in comparison with the time needed for streaming and sorting all of the triangles. For streams that are too small (for example less than 10000 triangles), the estimation is not robust enough and the method resorts to a simple median cut of the space region. The analysis for large streams involves computing the middle of the triangle span (min-max on the selected axis) for each selected triangle, clamped by the bounding box limits first (FIG. 5), and then computing the average position of all these points.

This approach is very simple, fast and performs slightly better than a direct median cut (~20%) with the constants mentioned above.

Re-Shuffling

Coordinates identifying the triangles may be re-shuffled for optimizing the method in terms of computing time and memory transfer. Minimum coordinates and maximum coordinates of each direction in space (x, y and z axis) of each primitive can be stored in three distinct lists. Middle or central coordinates are stored in a fourth list.

Experimental Results

Tests have been performed by an Intel-core 2 duo E6850 computer (3 GHz), associated with 4 GBs of memory and an NVidia 8800 GTX graphics card with 768 MBs. The implementations of the present disclosure—the DACRT and the reference packet ray-tracer—are SSE optimized and mono-threaded, thus only using a single core. Basic and display lists based implementation OpenGL results are given mainly for scaling comparison. More efficient on-board storage may be possible using other techniques known in the art. Rendering times for the DACRT and packet RT are given in FIGS. 5, 6 and 8 for the specific images shown and include basic shading and shadow rays when appropriate. Note that for the same clock frequencies, core 2 processors are significantly faster than P4 processors, even though the use of Hyper-Threading (HT) reduces the gap. Unless stated, all renderings use the conic packet acceleration.

Results of a first test are shown in FIG. 6, re-using the methodology introduced by Wachter and Keller (2006), with the image size fixed to 640×480. The results show a speedup for most models that actually tends to increase with problem size. The DACRT can be up to 7.5 times faster than an optimized kd-tree approach where construction and tracing are separated. The on-demand BIH approach is between 3× and 8× slower, but again, it is believed that using similar processor generations can reduce this gap by up to 40%.

Results of a second test are shown in FIG. 7. The image size is fixed to 1024×1024 and with more rays now involved, a much better efficiency is expected. For space reasons, only a limited set of techniques is compared here that tend to have similar hardware, but additional comparisons with other approaches such as in Havran, V., Herzog, R., and Seidel H.-P., "On the Fast Construction of Spatial Hierarchies for Ray Tracing," *Proceedings of the* 2006 *IEEE Symposium on Raytracing*, Salt-Lake City (2006) may lead to the same conclusions. As such, extra rendering times are taken from Shevtsov et al. (2007); Lagae and Dutré for dynamic contexts, and Overbeck, R., Ramamoorthi, R. and Mark, W. R., "A Real-Time Beam Tracer with Application to Exact Soft Shadows," *Proceedings of Eurographics Symposium on Rendering* 2007, for static MLRT (Reshetov, A., Soupikov, A. And Hurley, J., "Multi-level ray tracing algorithm," *Proceedings of ACM SIGGRAPH* 2005, Los Angeles, Vol. 24, No. 3, 1176-1185 (2005)) as results include one more dataset, and triangle or quad-based scene representations are tested. For Shevtsov et al., we included the kd-tree construction rate only, because different lighting conditions are used (e.g., fairy scene) which makes comparisons quite difficult.

FIG. 7 shows that when compared to other dynamic methods—OpenGL not included—our algorithm can be up to an order of magnitude faster, especially when large problems are to be solved. For instance, it takes 2.46 s to compute just the kd-tree data structure before even tracing rays and getting the final image for the That statue with 4 cores in Shevtsov et al. (2007), while the method of the present disclosure needs less than 0.8 s on a single core to achieve the final image. The difference is even bigger for the soda-hall scene—the tree is built in approximately 0.5 s with Shevtsov et al. (2007) on a four core/processor system versus 0.115 s obtained for the full image on a single/processor core with the present disclosure. The method of the present disclosure requires triangle sorting once per rendering pass as opposed to once per frame for other techniques, and therefore this difference may be at least halved if a shadow ray pass is needed. Logically, grids Lagae and Dutré do much better for isotropic scenes (2.7 s on a single core for the That statue) due to a faster construction but tracing seems quite inefficient for scenes with non-isotropic triangles (e.g., cabin and conference scenes are respectively 30 times and 21 times slower). Finally, the idea proposed by Wald et al. (2006) to update the data structure instead of reconstructing the data structure from scratch seems to be very efficient, but constructing the spatial subdivision for the first frame requires much time and therefore it has a reduced domain of applications.

The comparison with static renderers, assuming an already constructed spatial subdivision, tells us that the performance of a renderer using the method of the present disclosure is very good. The reference packet ray-tracer is on average slower than DACRT according to the present disclosure, although it can be up to 1.6× faster for the largest dataset. With an equivalent triangle-based scene representation, MLRT is apparently slower on average, but as an older generation processor was used, MLRT is likely to be faster on a core 2 platform, though not by much. As such, it is clear that streaming rays and cones in a breadth-first way (Nakamaru and Ohno 1997) is a very powerful alternative to regular depth-first top-down traversals of spatial subdivisions. It is nonetheless worth noting that even in the case of large datasets, the method of the present disclosure is even competitive when compared to static renderers and can justify not using an acceleration data structure in order to benefit from easier memory management, which may, in fact, be of importance with these datasets.

Finally, a rapid decrease in OpenGL (Open Graphics Library) performance can be seen when the size of the scene increases, even though a single CPU cannot really compete with dedicated hardware for small scenes. In the extreme case of a Lucy dataset—which cannot fit directly into the video memory—, the method of the present disclosure is about two times faster than rasterization.

Figure 8:
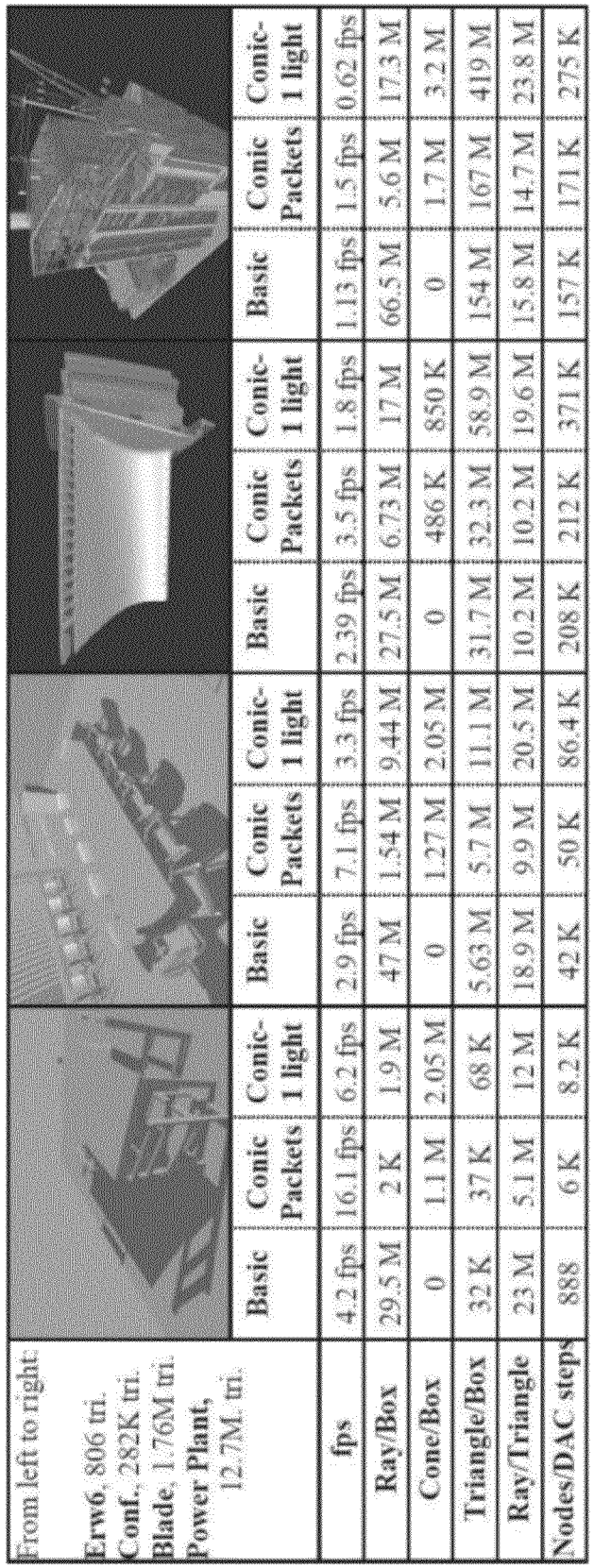
FIG. 8 illustrates the number of intersections and node traversals needed to generate a 1280×800 image with a method according to the present disclosure.

FIG. 8 gives further details about the number of steps needed by the method of the present disclosure, and also includes rendering times with a point light source. For the basic algorithm, the respective number of triangle/box and ray/box intersections is typically an order of magnitude greater than the respective numbers of triangles and rays in each rendering problem. As such, the algorithm is logically ray-bounded when the number of rays is much higher than the number of the triangles, and triangle-bounded in the opposite case. However, the introduction of the conic packets decreases the number of the ray and cone intersection tests by an order of magnitude. Of additional interest, is the fact that rendering times approximately double when a light source is activated, which is logical as the entire algorithm must be run again for secondary rays. It also appears that computing shadows is a slightly less efficient process than computing primary rays, probably because of the less regular distribution of shadow rays in space.

The Divide-And-Conquer Ray-Tracing is a new and simple algorithm demonstrating that solving ray-triangle intersection problems extremely rapidly can be achieved without the necessity of using or storing a spatial subdivision data structure. Some advantages include the possibility of handling sets of triangles and rays as "soups" in main memory, solving larger problems, and having a simplified and deterministic memory management. Time-to-image is decreased several-fold for typical rendering resolutions when compared with recent publications, making this approach well suited to dynamic scene contexts. This is especially true as the scene becomes larger. Whereas other approaches are no longer interactive when there are more than a few hundred thousand triangles, the present disclosure can interactively process millions of triangles.

All these advantages come, however, at the expense of bundling enough rays per rendering pass to obtain maximum efficiency by maintaining a comparatively low cost for streaming triangles. The same issue also appears with traditional graphics hardware, which has been successful industrially. The present disclosure may further be applied to parallel CPUs and GPUs implementations as the low memory requirements of the method and implementation of the present disclosure seem perfectly suited to the latter.

Finally, the examples given herein have been restricted to only one type of spatial subdivision scheme and one type of primitive (triangles). Other types of spatial subdivisions have already demonstrated now well-known advantages and disadvantages for the visualization of triangles and remain compatible with our approach. Specialized heuristics and the optimal subdivision scheme may be determined by a person skilled in the art. Beyond the present disclosure, the general divide-and-conquer scheme can be applied to numerous fields of computer graphics where existing solutions may not be satisfactory.

Cone/Edge Intersection

Figure 9:
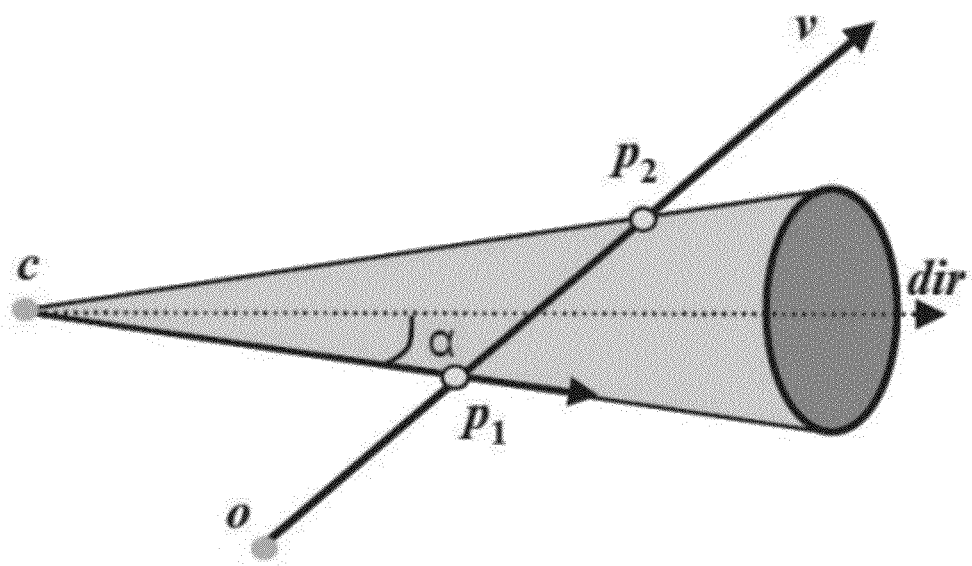
FIG. 9 shows a line-cone intersection used with the present disclosure.

FIG. 9 shows a line-cone or edge-cone intersection. The starting point on our edge-cone intersection solution (see, Eberly (2000)) is that at the intersection location(s), an angle $\alpha$ is made between the main cone direction and a vector defined from the cone centre and the intersection point. The following equation holds:

$$\frac{\overrightarrow{cp_1}}{\|\overrightarrow{cp_1}\|} \cdot \frac{\overrightarrow{dir}}{\|\overrightarrow{dir}\|} = \cos(\alpha)$$

Now we can simplify the problem by squaring the two sides of the equation and supposing that the cone direction is normalized. We get:

$$((o+v \cdot t-c) \cdot dir)^2 = (\cos(\alpha) \cdot \|o+v \cdot t-c\|)^2$$

Finally, expanding the equations leads to a second degree polynomial that can easily be solved to get the two intersection parameters:

$$((v \cdot dir)^2 - \cos^2(\alpha)) \cdot t^2 + (2 \cdot (co \cdot dir) \cdot (v \cdot dir) - 2 \cdot \cos^2(\alpha)(co \cdot v)) \cdot t + (co \cdot dir)^2 - \cos^2(\alpha) co^2 = 0$$

Note that if no real roots exist, then there is no intersection between the cone and the edge. The final step involves checking that the edge range actually falls between the roots, and that the solution is actually on the positive side of the cone. Indeed, firstly squaring both sides of the equation introduces a double-sided cone problem.

What I claim is:

1. A method for determining possible spatial intersections between an initial set of rays and an initial set of primitives for the purpose of creating a computer graphics image of a three dimensional scene using a deterministic approach, the method comprising:
   a) Determining a multidimensional space region related to the three dimensional scene comprising all primitives of the initial set of primitives;
   b) Testing if a halting criterion is met;
      if the halting criterion is met, determining intersections between the initial set of rays and the initial set of primitives by testing all possible ray/primitive intersections and continuing with step f);
      if the halting criterion is not met, continuing with step c);
   c) dividing the initial region into two or more subregions;
   d) determining for each one of the two or more subregions, a subset of rays from the initial set of rays which are intersecting the one of the two or more subregions, determining a subset of primitives from the initial set of primitives which are intersecting the one of the two or more subregions; and streaming all the rays of the initial set of rays or all the primitives of the initial set of primitives, wherein the streaming is performed in-place using up to three pivots;
   e) recursively repeating step b) for each one of the two or more subregions, wherein the initial region, the initial set of rays, and the initial set of primitives are respectively replaced by the subregion, the subset of rays and the subset of primitives;
   f) updating the spatial intersections;
   g) grouping rays into one or more packets, where the packets are defined as cones comprising a cone origin, a cone main direction and a cone angle, where the initial set of rays is replaced by the one or more packets; and
   h) triangle sorting per rendering pass.

2. The method of claim 1, wherein the halting criterion is met if at least one of the number of rays in the initial set of rays is less than a first value, or the number of primitives in the initial set of primitives is less than a second value, or a maximum recursion depth is reached.

3. The method of claim 2, wherein at least one of the first value, the second value and the maximum recursion depth are dynamically modifiable.

4. The method of claim 1, wherein step d) comprises streaming all the rays of the initial set of rays or all the primitives of the initial set of primitives, wherein the streaming is performed using some additional memory storage if available.

5. The method of claim 1, further comprising storing relating to the method in a memory storage not more than one of: A description of the initial set of primitives, a description of the initial set of rays, a data structure storing the intersection results for each one of the initial set of rays, an execution stack and a heap with sizes independent of the initial set of rays, the initial sat of primitives, and the program binary code.

6. The method of claim 1, further comprising determining memory requirements as a linear function of the number of primitives in the initial set of primitives and the number of rays in the initial set of rays prior to any one of steps a) to f).

7. The method of claim 1, wherein the multidimensional space is fixed to n dimensions, wherein n≥2.

8. The method of claim 1, wherein each ray of the initial set of rays corresponds to either a primary ray cast from a camera, or a shadow ray cast toward a light source, or any random direction in space.

9. The method of claim 1, wherein the initial set of primitives is dynamically changing over time, and the method further comprise repeating steps a) to f) after a pre-determined time interval.

10. The method of claim 1, wherein the primitives are triangles, tetrahedrons, cubes, voxels, subdivision surfaces, and nonuniform rational B-splines.

11. The method of claim 1, wherein the multidimensional space region is a 3D Euclidean space and step c) is based on an Axis-Aligned Spatial Subdivision scheme of the 3D euclidean space.

12. The method of claim 1, further comprising excluding rays from the set of rays when a first intersection has been detected.

13. The method of claim 1, further comprising early ray termination by excluding rays from the set of rays if a closer intersection has already been detected.

14. The method of claim 1, wherein additional indexing arrays are used for optimization purposes.

15. The method of claim 1, wherein step (b) is performed for each one of the subspaces in an order relating to their position with respect to a viewpoint.

16. The method of claim 1, further comprising fixing subregions and their intersections with the primitives of the set of primitives beforehand.

17. A computer program product directly loadable into an internal memory of a computer for executing a method for determining possible spatial intersections between an initial set of rays and an initial set of primitives for the purpose of creating a computer graphics image of a three dimensional scene using a deterministic approach, the method comprising:
   a) Determining a multidimensional space region related to the three dimensional scene comprising all primitives of the initial set of primitives;
   b) Testing if a halting criterion is met;
      if the halting criterion is met, determining intersections between the initial set of rays and the initial set of primitives by testing all possible ray/primitive intersections and continuing with step f);
   if the halting criterion is not met, continuing with step c);
   c) dividing the initial region into two or more subregions;
   d) determining for each one of the two or more subregions, a subset of rays from the initial set of rays which are intersecting the one of the two or more subregions; determining a subset of primitives from the initial set of primitives which are intersecting the one of the two or more subregions; and streaming all the rays of the initial set of rays or all the primitives of the initial set of primitives, wherein the streaming is performed in-place using up to three pivots;
   e) recursively repeating step b) for each one of the two or more subregions, wherein the initial region, the initial set of rays, and the initial set of primitives are respectively replaced by the subregion, the subset of rays and the subset of primitives;
   f) updating the spatial intersections;
   g) grouping rays into one or more packets, where the packets are defined as cones comprising a cone origin, a cone main direction and a cone angle, where the initial set of rays is replaced by the one or more packets; and
   h) triangle sorting per rendering pass.

18. A computer system for providing digital image data to a first interface and a second interface for obtaining information about a space to be imaged, the system using a method for determining possible spatial intersections between an initial set of rays and an initial set of primitives for the purpose of creating a computer graphics image of a three dimensional scene using a deterministic approach, the method comprising:
   a) Determining a multidimensional space region related to the three dimensional scene comprising all primitives of the initial set of primitives;
   b) Testing if a halting criterion is met;
      if the halting criterion is met, determining intersections between the initial set of rays and the initial set of primitives by testing all possible ray/primitive intersections and continuing with step f);
      if the halting criterion is not met, continuing with step c);
   c) dividing the initial region into two or more subregions;
   d) determining for each one of the two or more subregions, a subset of rays from the initial set of rays which are intersecting the one of the two or more subregions; determining a subset of primitives from the initial set of primitives which are intersecting the one of the two or more subregions; and streaming all the rays of the initial set of rays or all the primitives of the initial set of primitives, wherein the streaming is performed in-place using up to three pivots;
   e) recursively repeating step b) for each one of the two or more subregions, wherein the initial region, the initial set of rays, and the initial set of primitives are respectively replaced by the subregion, the subset of rays and the subset of primitives;
   f) updating the spatial intersections;
   g) grouping rays into one or more packets, where the packets are defined as cones comprising a cone origin, a cone main direction and a cone angle, where the initial set of rays is replaced by the one or more packets; and
   h) triangle sorting per rendering pass.

19. The computer system of claim 18, wherein the computer system comprises a computer graphics system.

20. A method for determining possible spatial intersections between a first initial set of primitives and a second initial set of primitives for the purpose of creating a computer graphics image of a three dimensional scene using a deterministic approach, the method comprising:
   a) Determining a multidimensional space region related to the three dimensional scene that comprises all primitives of the first initial set of primitives;
   b) Testing if a halting criterion is met;
      if the halting criterion is met, determining intersections between the first initial set of primitives and the second initial set of primitives by testing all possible primitive/primitive intersections and continuing with step f);
      if the halting criterion is not met, continuing with step c);
   c) dividing the initial region into two or more subregions;
   d) determining for each one of the two or more subregions, a first subset of primitives from the first initial set of primitives which are intersecting the one of the two or more subregions; determining a second subset of primitives from the second initial set of primitives which are intersecting the one of the two or more subregions; and streaming all the rays of the initial set of rays or all the primitives of the initial set of primitives, wherein the streaming is performed in-place using up to three pivots;
   e) recursively repeating step b) for each one of the two or more subregions, wherein the initial region, the first initial set of primitives, and the second initial set of primitives are respectively replaced by the subregion, the first subset of primitives and the second subset of primitives;
   f) updating intersections;
   g) grouping rays into one or more packets, where the packets are defined as cones comprising a cone origin, a cone main direction and a cone angle, where the initial set of rays is replaced by the one or more packets; and
   h) triangle sorting per rendering pass.

* * * * *